US012807391B2

(12) United States Patent
Ji et al.

(10) Patent No.: US 12,807,391 B2
(45) Date of Patent: Nov. 24, 2026

(54) FRESH-KEEPING VACUUM BOTTLE WITH TWO COMPARTMENTS

(71) Applicant: ZHEJIANG UKPACK PACKAGING CO., LTD, Yuyao City (CN)

(72) Inventors: Shunjin Ji, Yuyao City (CN); Da Xu, Yuyao City (CN)

(73) Assignee: ZHEJIANG UKPACK PACKAGING CO., LTD, Yuyao City (CN)

(*) Notice: Subject to any disclaimer, the term of this patent is extended or adjusted under 35 U.S.C. 154(b) by 168 days.

(21) Appl. No.: 18/657,913

(22) Filed: May 8, 2024

(65) Prior Publication Data

US 2024/0417155 A1 Dec. 19, 2024

(30) Foreign Application Priority Data

Jun. 19, 2023 (CN) ........................ 202310729384.X

(51) Int. Cl.

| | |
|---|---|
| ***B65D 83/06*** | (2006.01) |
| ***B05B 11/10*** | (2023.01) |
| ***B65D 81/32*** | (2006.01) |

(52) U.S. Cl.

CPC .......... *B65D 83/06* (2013.01); *B05B 11/1047* (2023.01); *B05B 11/1081* (2023.01); *B65D 81/3211* (2013.01); *B65D 2205/02* (2013.01)

(58) Field of Classification Search

CPC ............. B05B 11/0038; B05B 11/0054; B05B 11/0081; B05B 11/1047; B05B 11/1081; B65D 1/04; B65D 81/3211; B65D 83/765; B65D 83/06; B65D 2205/02

USPC .......................................................... 222/401

See application file for complete search history.

(56) References Cited

U.S. PATENT DOCUMENTS

| | | | | |
|---|---|---|---|---|
| 7,367,709 | B2 * | 5/2008 | Ki | B05B 11/0081 366/130 |
| 10,864,539 | B2 * | 12/2020 | Delmon | B05B 11/028 |
| 10,981,689 | B2 * | 4/2021 | Altus | B65D 1/04 |
| 2021/0000240 | A1 * | 1/2021 | Lee | B05B 11/0054 |

FOREIGN PATENT DOCUMENTS

| | | |
|---|---|---|
| CN | 204624277 U | 9/2015 |
| CN | 112278534 A | 1/2021 |
| CN | 213324143 U | 6/2021 |
| CN | 216862429 U | 7/2022 |

* cited by examiner

*Primary Examiner* — Vishal Pancholi

(74) *Attorney, Agent, or Firm* — Oliff PLC

(57) ABSTRACT

A fresh-keeping vacuum bottle includes an upper storage cavity and a lower storage cavity for holding separate materials. The bottle includes a fixed large circle, a rotating large circle, and an inner sleeve large circle, with the fixed large circle being connected through snap fitting to an inner bottle in which the lower storage cavity is defined. The rotating large circle rotates a sealing plug until an upper through hole of the rotating large circle, a middle through hole of the sealing plug, and a lower through hole of the fixed large circle are aligned, thereby causing material stored in the upper storage cavity to fall into the lower storage cavity to mix with liquid stored in the lower storage cavity.

12 Claims, 8 Drawing Sheets

FRESH-KEEPING VACUUM BOTTLE WITH TWO COMPARTMENTS

TECHNICAL FIELD

The present invention relates to a vacuum bottle, or specifically, a fresh-keeping vacuum bottle with two compartments.

BACKGROUND ART

Vacuum bottle is a kind of container used to isolate the gas from the outside temperature or to isolate the cosmetic container from the outside bacteria, which generally comprises of a cylindrical container and a piston placed at the bottom. In order to facilitate the mixing of two liquids or powders in the vacuum bottle, some vacuum bottles adopt liquid mixing mode by engaging two sets of bottles, while other bottles have two compartments set in the vacuum bottle, as disclosed in the Chinese patent document under the application Ser. No. 20/222,0231955.8, the date of authorization: 1 Jul. 2022, the utility model patent entitled "A rotary double-liquid mixing vacuum bottle"; as disclosed in the Chinese patent document under the application No. 202021667654.7, the date of authorization: 1 Jun. 2021, the utility model patent entitled "A double-compartment vacuum mixing cosmetic packaging container"; as disclosed in the Chinese patent document under the application Ser. No. 20/201,1237088.0, the date of authorization: 29 Jan. 2021, the utility model patent entitled "A vacuum bottle with two compartments"; as disclosed in the Chinese patent document under the application No. 201520299856.3, the date of authorization: 9 Sep. 2015, the utility model patent entitled "A double-compartment mixing vacuum bottle"; the above products and similar products generally adopt the way of setting up the inner cavity at the inner diameter of the bottle mouth, and cause the opening of the inner cavity by pressing the head cap to drive the valve stem to move to the inside of the bottle, i.e., pressing the pump head and opening the top of the pump head; however, it is less likely to use the through hole of the rotating large circle of openings above the bottle mouth to drop the material into the bottle. This structural design makes it susceptible to moisture, making it more challenging to package lyophilized powder products. Additionally, the internal and external bottle structure is less used, and the inner bottle is not extensively designed with functional replacement devices for repeated and assembled use.

SUMMARY OF THE INVENTION

In order to overcome the above deficiencies, the object of the present invention is to provide a fresh-keeping vacuum bottle with two compartments in the field, so that it can solve the technical problems of the existing similar products that are difficult to be used for packaging lyophilized powder and other powder products, which are susceptible to moisture, and are difficult to be used as a replacement for reuse and assembly use. This object is attained by the following technical solutions.

A fresh-keeping vacuum bottle with two compartments, comprising a piston inside the bottle body, a vent hole disposed on the bottom side of the bottle body. The mouth of the bottle body is connected to a large circle through snap fitting, thus creating a lower liquid storage cavity. The liquid compartment is connected to the head cap through the valve stem of the pump core assembly, in which the valve stem extends out in a large circle; wherein the said large circle comprises a fixed large circle, a rotating large circle, and an inner sleeve large circle. The fixed large circle is attached to the mouth of the bottle body through snap fitting, a gasket is provided at the joint, a lower through hole is provided on the side of the fixed large circle at the mouth above the lower liquid storage cavity in the bottle body, an upper through hole is provided on the side of the rotating large circle corresponding to the lower through hole; a sealing plug is disposed on the fitting face where the rotating large circle is fastened and attached to the fixed large circle, the said sealing plug is affixed to the bottom of the rotating large circle, the middle through hole of the sealing plug aligns with the upper through hole of the rotating large circle. The circle rim at the bottom of the inner sleeve large circle is fastened and attached to the circle rim inner diameter on the top of the rotating large circle. The pump core assembly is fastened and attached to the large circle of the inner sleeve large circle or the rotating large circle, with the pump body outer diameter hermetically fit to the fixed large circle, rotating large circle, and inner sleeve large circle. An upper liquid storage cavity is formed between the top groove of the rotating large circle and the bottom groove of the inner sleeve large circle. When the rotating large circle drives the sealing plug to rotate towards a certain position, making the upper through hole of the rotating large circle, the middle through hole of the sealing plug, and the lower through hole of the fixed large circle aligned sequentially, the material stored in the upper storage cavity falls into the bottle body until it mixes with the liquid stored in the body. Gripping the fixed large circle and rotating it to align the upper through hole of the rotating large circle in the upper storage cavity and the middle through hole of the sealing plug with the lower through hole of the lower fixed large circle. The above rotating large circle acts as a rotating shoulder sleeve, so that the two materials are mixed together; to load powder, open the inner sleeve large circle without contacting the material, so it is not susceptible to moisture. This solution is suitable for packaging lyophilized powder products.

The pump mouth at the pump body of the said pump core assembly is fastened and attached to the upper catch groove located in the middle of the top section of the inner sleeve large circle. The lower catch ring of the bottom groove of the inner sleeve large circle is fastened and attached to the inner catch ring of the top groove of the rotating large circle. The pump core assembly is disposed within the pump core cavity hermetically formed by the inner sleeve large circle, the rotating large circle, and the fixed large circle.

An inner wall circle is disposed on the inner diameter where the inner sleeve large circle is fastened and attached to the rotating large circle, the ring mouth on the bottom of the inner sleeve large circle is hermetically fastened and attached to outer ring groove between the inner diameter of the top ring mouth of the rotating large circle and the inner wall circle, and the outer ring mouth of the inner wall circle positioned lower than the inner ring mouth at the inner catch ring of the rotating large circle. The overflow of material from the upper storage cavity into the pump core compartment is prevented, thereby enhancing the sealing effectiveness of the upper storage cavity.

A head cap sleeve mouth that is smaller than the lower outer diameter and protruded is disposed in the middle of the top section of the inner sleeve large circle, the upper catch groove of the inner sleeve large circle is provided on the bottom of the inner diameter of the head cap sleeve mouth, the cover latch rib of the inner sleeve large circle and the upper storage cavity at the head cap sleeve mouth protrude upwardly, the bottom cap latch of the head cap is inserted into the head cap sleeve mouth of the inner sleeve large circle, and a nozzle with an outwardly protruded outer diameter disposed at the liquid outlet of the head cap. The above structure further increases the space and volume of the upper storage cavity and prevents the inflow of overflowing liquid from the head cap.

A cover latch rib is provided above the point where the said inner sleeve large circle is fastened to the rotating large circle and that is smaller than the outer diameter of the bottom ring mouth, the mouth of the outer cover is fastened and attached to the cover latch rib of the inner sleeve large circle. The specific position where the outer cover is fastened to the inner sleeve large circle is described above. Alternatively, it can be fastened to the outer diameter and other position disposed on the rotating large circle.

A funnel-shaped bottom face that is intensively sinking towards the upper through hole of the rotating large circle is disposed on the bottom of the upper storage cavity of the top groove of the said rotating large circle. The above structure facilitates the total discharge or fall of the material in the upper storage compartment.

The sealing plug has notches on the outer diameter of its edge and on the inner diameter of the central hole respectively. The rotating large circle has a locating column protruded on the bottom of the rotating large circle corresponding to the notch. The sealing plug is joined to the bottom of the rotating large circle, and a protruded sealing rib is provide at the bottom hole mouth of the middle through hole of the sealing plug. The above structure makes it easier for the sealing plug to be secured to the bottom of the rotating large circle, or alternatively, it can be also secured by plastic screws, end snap fasteners and other methods.

An upwardly protruded circle latch is symmetrically disposed on the ring mouth of the fixed large circle where the said fixed large circle is attached to the rotating large circle, and raised pieces that are equidistantly distributed are provided in the top ring groove at the attached point where the ring latch corresponds to the rotating large circle. Thus, it is convenient for the rotating large circle to generate resistance and sound when rotating, and realize opening and closing by combining with the logo, i.e., the above-mentioned snap point design prevents liquid leakage from the open compartment when rotating back during transit.

A downwardly protruded funnel nozzle is disposed in the center of the pump core assembly of the said fixed large circle, the liquid inlet hole at the bottom of the pump body of the pump core assembly aligns with the funnel nozzle of the fixed large circle, or the suction pipe hole at the bottom of the pump core assembly is inserted into the funnel nozzle of the fixed large circle.

The said bottle comprises an inner bottle and an outer bottle. The vent hole is located on the bottom side of the inner bottle, and the bottle body is fastened and attached to the fixed large circle through the mouth of the inner bottle, and the inner bottle, the fixed large circle, the rotating large circle, the inner sleeve large circle (8), the pump core assembly, and the head cap are connected sequentially to form a replacement bottle. After the upper storage compartment of the replacement bottle is filled, the inner bottle is filled and assembled with the outer bottle for use.

Fastening holes are symmetrically located on the mouth of the said outer bottle. Lead-in grooves are provided on the inner diameter side of the outer bottle mouth corresponding to the fastening holes respectively. Protruded fixing ribs are provided on the lower outer diameter where the inner bottle is fastened to the rotating large circle respectively. The inner body is inserted to the lead-in groove of the outer bottle through the fixing ribs, then revolvably secured to the fastening hole of the inner bottle, and the inner body engages with the outer bottle.

The outer diameters of the said rotating large circle and the fixed large circle are respectively provided with a toothed ring that is easy to grip and rotate.

The present invention has reasonable structural design, easy to use and carry, good sealing and stability, good moisture-proof effect, and is suitable for reuse and assembly as a replacement bottle; it is mainly used as a double-compartment fresh-keeping vacuum bottle for powder storage, and the structural modification of its similar products.

BRIEF DESCRIPTION OF ACCOMPANYING DRAWINGS

Figure 1:
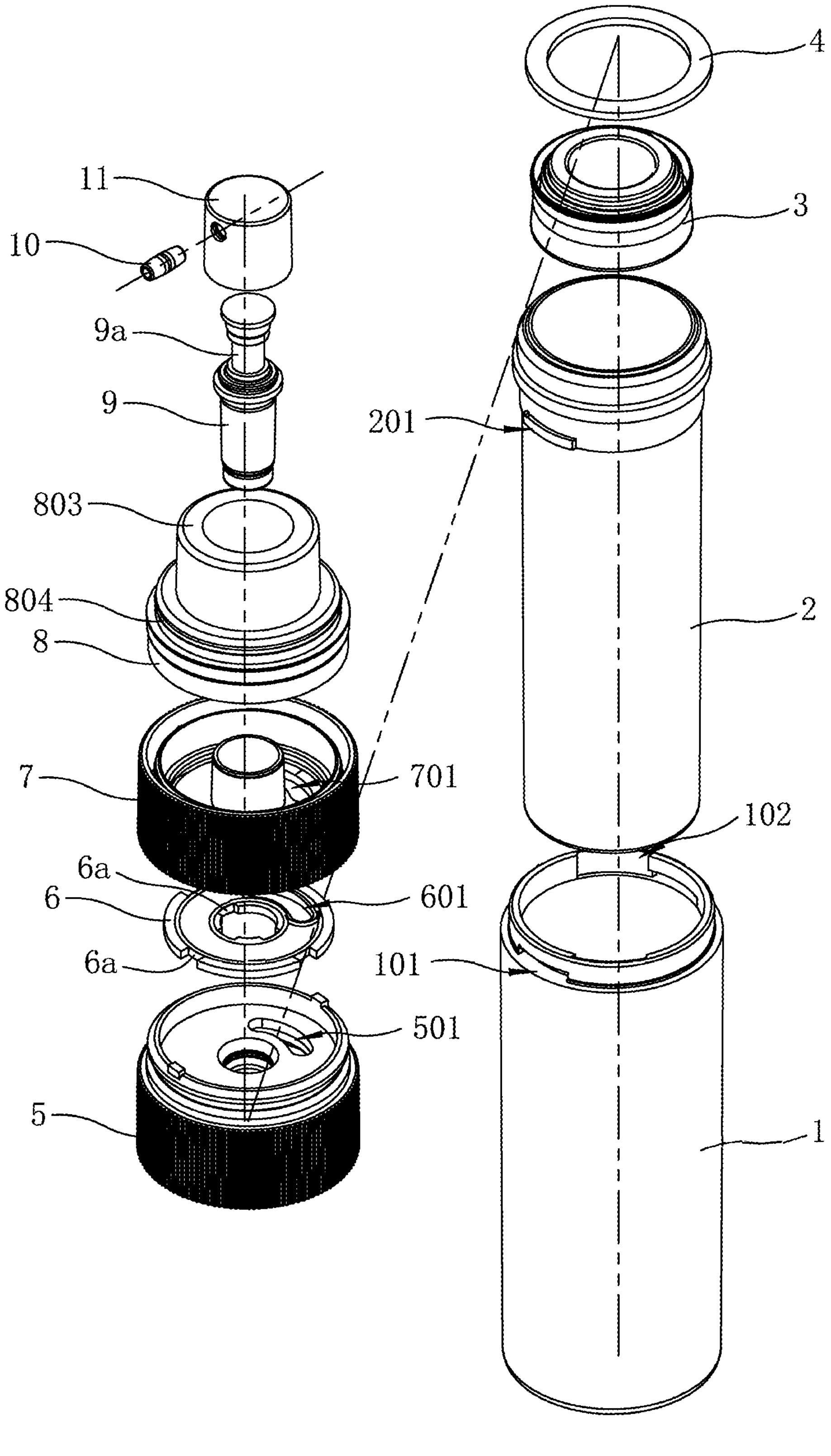
FIG. 1 is a schematic diagram of an exploded structure of the first embodiment of the present invention.
Figure 2:
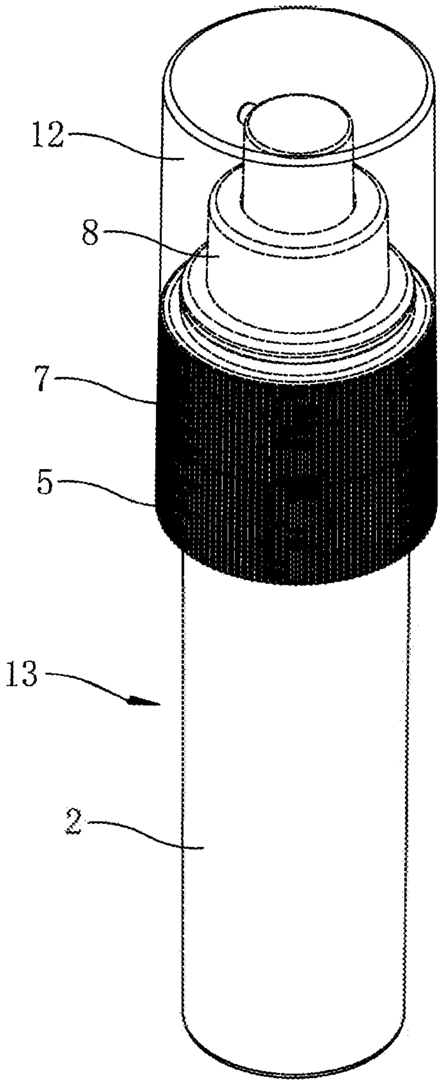
FIG. 2 is a schematic diagram of the replacement bottle structure of FIG. 1, with the dotted line showing the inner structure of the outer cover.
Figure 3:
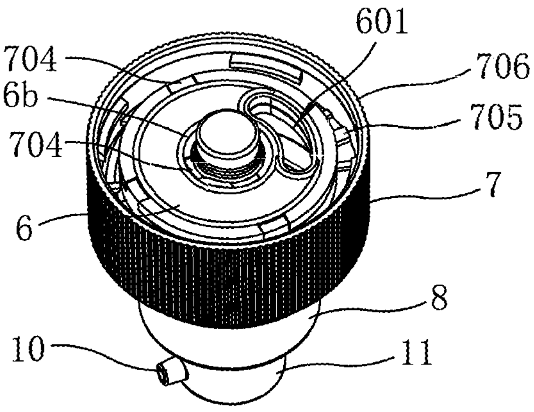
FIG. 3 is a schematic diagram of the bottom structure of the head cap assembly of FIG. 2.
Figure 4:
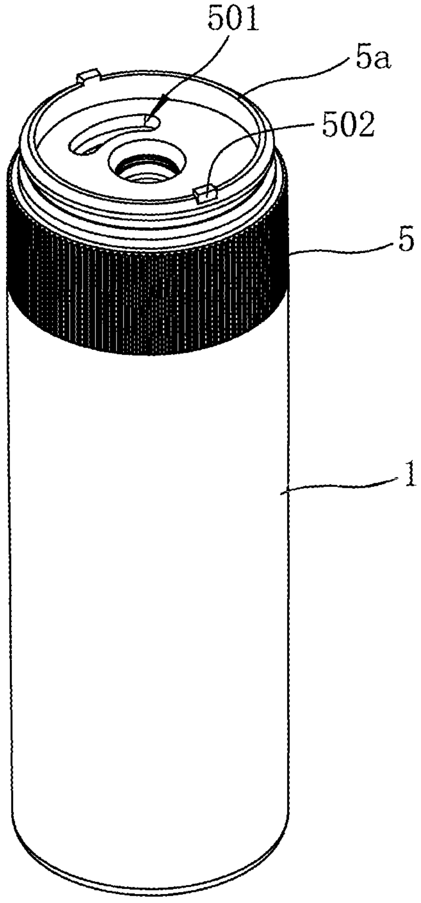
FIG. 4 is a schematic diagram of the bottle assembly structure of FIG. 2 with the addition of the outer bottle.
Figure 5:
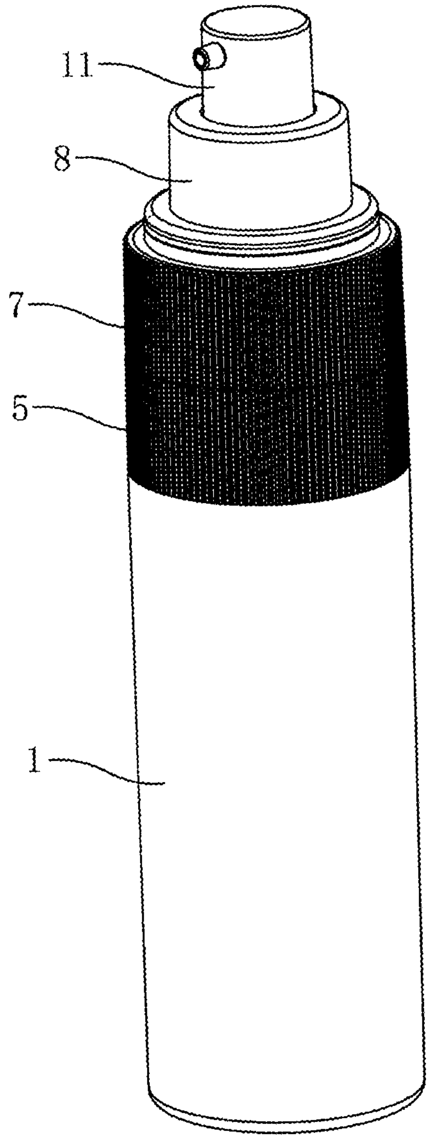
FIG. 5 is a schematic structural diagram of FIG. 2 in use with the addition of the outer bottle.
Figure 6:
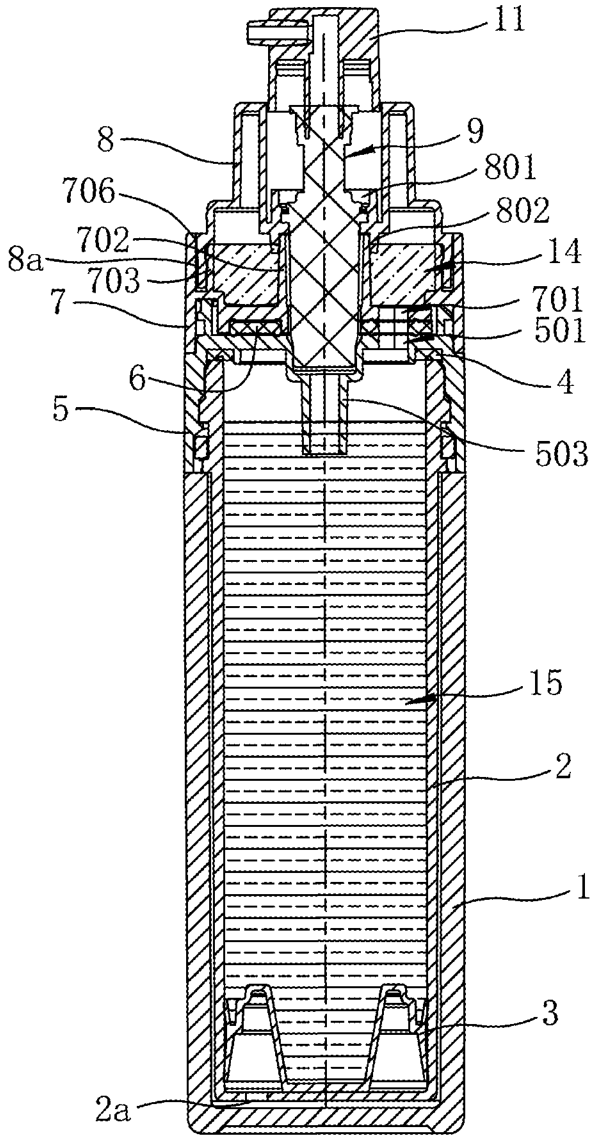
FIG. 6 is a schematic diagram of the sectional structure of FIG. 5.

Serial numbers and names of the accompanying drawings: 1. Outer bottle, 101. Fastening hole, 102. Lead-in groove, 2. Inner bottle, 2*a*. Vent hole, 201. Fixing rib, 3. Piston, 4. Gasket, 5. Fixed large circle, 5*a*. Ring mouth, 501. Lower through hole, 502. Ring latch, 503. Funnel nozzle, 6. Sealing plug, 6*a*. Notches, 6*b*. Protruded sealing rib, 601. Middle through hole, 7. Rotating large circle, 701. Upper through hole, 702. Inner catch circle, 703. Inner wall circle, 704. Locating column, 705. Raised piece, 706. Top ring mouth, 8. Inner sleeve large circle, 8*a*. Ring mouth, 801. Upper catch groove, 802. Lower catch groove, 803. Head cap sleeve mouth, 804. Cover latch rib, 9. Pump core assembly, 9*a*. Valve stem, 10. Nozzle, 11. Head cap, 12. Outer cover, 13. Replacement bottle, 14. Upper storage compartment, 15. Lower storage compartment.

EMBODIMENTS

The structure of the present invention is further described in conjunction with the accompanying drawings. As shown in FIGS. 1-6, in Embodiment 1, the vacuum bottle comprises an inner bottle 2 and an outer bottle 1, a piston 3 is provided in the inner bottle, a vent hole 2*a* is located on the bottom side of the inner bottle 2 (see FIG. 6), and the inner bottle 2 is fastened and attached to a fixed large circle 5 through a mouth of the inner bottle 2. A gasket 4 is provided at a joint between the fixed large circle 5 and the mouth of the inner bottle 2. The inner bottle 2, the fixed large circle 5, a rotating large circle 7, an inner sleeve large circle 8, a pump core assembly 9, and a head cap 11 are connected sequentially to form a replacement bottle 13. The mouth of the inner bottle 2 is connected to a circle assembly through snap fitting, thus creating a lower liquid storage cavity 15. The circle assembly comprises the fixed large circle 5, the rotating large circle 7, and the inner sleeve large circle 8. A valve stem 9*a* of a pump core assembly 9 extends out of the circle assembly and is connected to the head cap 11. A lower through hole 501 is provided in the fixed large circle 5 at a position above the lower liquid storage cavity 15. An upper through hole 701 is provided in the rotating large circle 7 at a position corresponding to the lower through hole 501. A sealing plug 6 is disposed between the rotating large circle 7 and the fixed large circle 5. The sealing plug 6 is affixed to a bottom of the rotating large circle 7. A middle through hole 601 of the sealing plug 6 aligns with the upper through hole 701 of the rotating large circle 7. A ring mouth 8*a* at a bottom of the inner sleeve large circle 8 is fastened and attached to an inner wall circle 703 on the top of the rotating large circle 7. The pump core assembly 9 is fastened and attached to the inner sleeve large circle 8, and an outer circumference of the pump core assembly 9 is hermetically fit to the fixed large circle 5, the rotating large circle 7, and the inner sleeve large circle 8. An upper liquid storage cavity 14 is formed between a top surface of the rotating large circle 7 and a bottom surface of the inner sleeve large circle 8. When the rotating large circle 7 drives the sealing plug 6 to rotate towards a certain position, making the upper through hole 701 of the rotating large circle 7, the middle through hole 601 of the sealing plug 6, and the lower through hole 501 of the fixed large circle 5 aligned sequentially, the material stored in the upper storage cavity 14 falls into the lower liquid storage cavity 15 and mixes with the liquid stored in the lower liquid storage cavity 15.

A pump mouth of the pump core assembly 9 is fastened and attached to an upper catch groove 801 of the inner sleeve large circle 8, and a lower catch ring 802 of the inner sleeve large circle 8 is fastened and attached to an inner catch ring 702 of the rotating large circle 7. The pump core assembly 9 is disposed within a pump core cavity hermetically formed by the inner sleeve large circle 8, the rotating large circle 7, and the fixed large circle 5. The inner wall circle 703 is disposed on the rotating large circle 7 where the inner sleeve large circle 8 is fastened and attached to the rotating large circle 7, the ring mouth 8*a* on the bottom of the inner sleeve large circle 8 is hermetically fastened and attached to a ring groove between the inner diameter of a top ring mouth 706 of the rotating large circle 7 and the inner wall circle 703, and an upper edge of the inner wall circle 703 is positioned lower than an upper edge of the inner catch ring 702 of the rotating large circle 7. A head cap sleeve mouth 803 that is smaller than an outer diameter of a bottom section of the inner sleeve large circle 8, and protrudes upward, is disposed in the middle of a top section of the inner sleeve large circle 8. The upper catch groove 801 of the inner sleeve large circle 8 is provided on the bottom of the inner diameter of the head cap sleeve mouth 803. A cover latch rib 804 protrudes outward from the inner sleeve large circle 8. The head cap sleeve mouth 803 protrudes upwardly, a bottom cap latch of the head cap 11 is inserted into the head cap sleeve mouth 803 of the inner sleeve large circle 8, and a nozzle 10 with an outwardly protruded outer diameter is disposed at the liquid outlet of the head cap 11. The cover latch rib 804 is provided above the point where the inner sleeve large circle 8 is fastened to the rotating large circle 7 and that is smaller than the outer diameter of the bottom ring mouth, and a mouth of an outer cover 12 is fastened and attached to the cover latch rib 804 of the inner sleeve large circle 8. A funnel-shaped bottom face that is intensively sinking towards the upper through hole 701 of the rotating large circle 7 is disposed on the bottom of the upper storage cavity 14 of the rotating large circle 7.

The sealing plug 6 has notches 6*a* on the outer diameter of its edge and on the inner diameter of its central through hole respectively. The rotating large circle 7 has locating columns 704 protruded on the bottom of the rotating large circle 7 corresponding to the notches 6*a*. The sealing plug 6 is joined to the bottom of the rotating large circle 7, and a protruded sealing rib 6*b* is provided at the bottom hole mouth of the central through hole of the sealing plug 6. Upwardly protruded ring latches 502 are symmetrically disposed on a ring mouth 5*a* of the fixed large circle 5 where the fixed large circle 5 is attached to the rotating large circle 7, and raised pieces 705 that are equidistantly distributed are provided in the rotating large circle 7 at points where the ring latches 502 fits against the rotating large circle 7. A downwardly protruded funnel nozzle 503 is disposed in the center of the fixed large circle 5, and a liquid inlet hole at the bottom of the pump core assembly 9 aligns with the funnel nozzle 503 of the fixed large circle 5. Fastening holes 101 are symmetrically located on the mouth of the outer bottle 1. Lead-in grooves 102 are provided on the inner diameter side of the mouth of the outer bottle 1 corresponding to the fastening holes 101 respectively. Protruded fixing ribs 201 are provided on the outer circumference of the inner bottle 2 where the inner bottle 2 is fastened to the rotating large circle 7 respectively. The fixing ribs 201 are inserted into the lead-in grooves 102 of the outer bottle 1 through the fixing ribs 201, then revolvably secured to the fastening holes 101 of the inner bottle 2, and the inner bottle 2 engages with the outer bottle 1.

Figure 7:
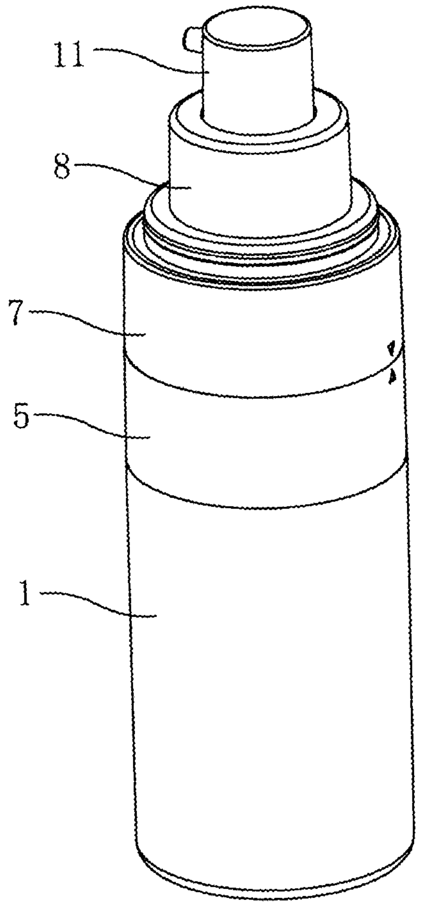
FIG. 7 is a schematic diagram of the three-dimensional structure of the second embodiment of the present invention.
Figure 8:
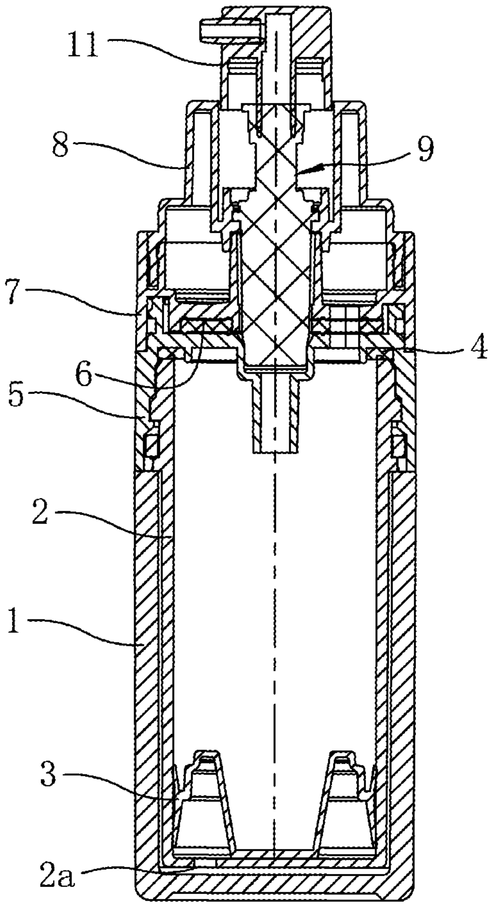
FIG. 8 is a schematic diagram of the sectional structure of FIG. 7.
Figure 9:
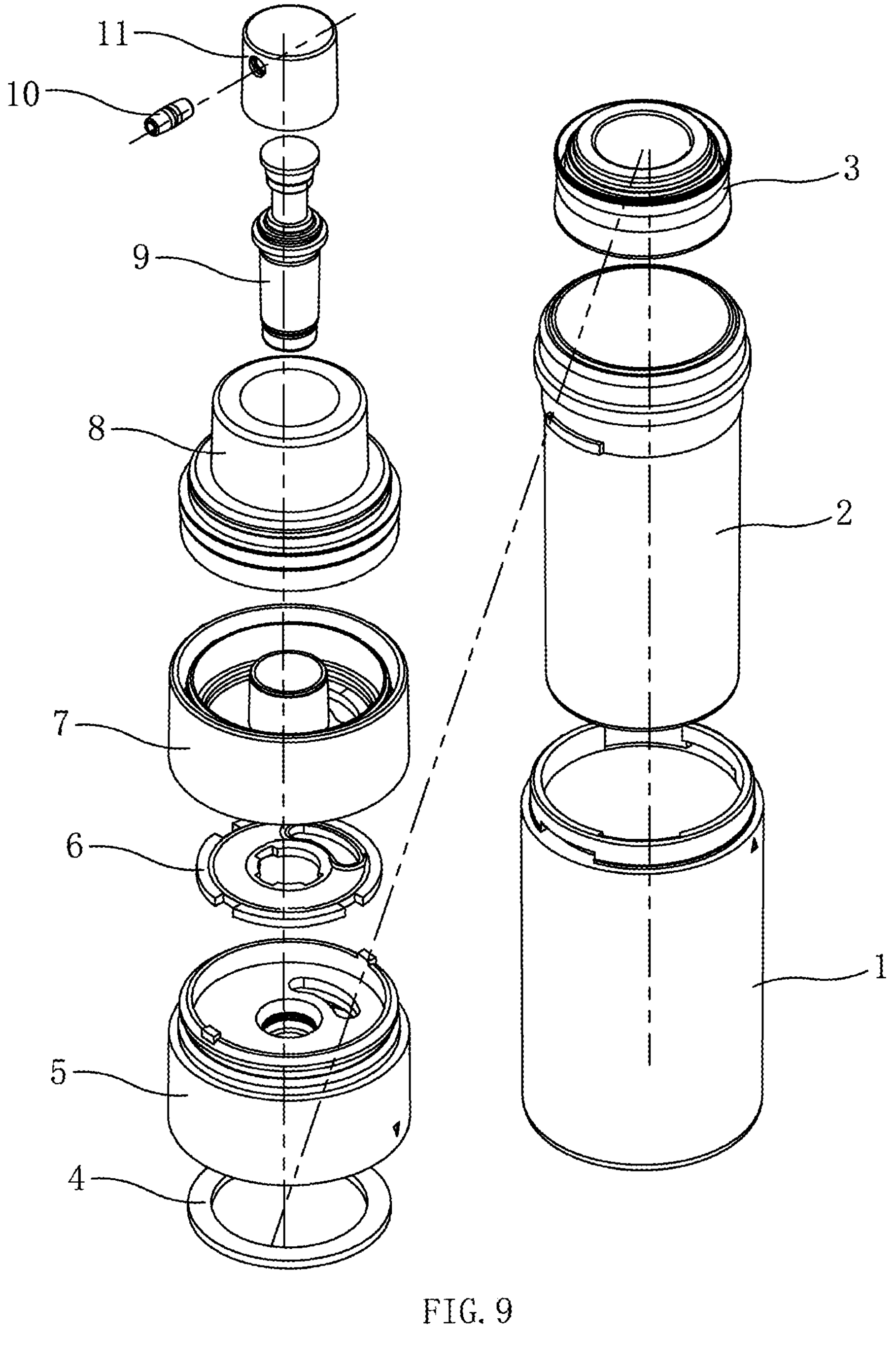
FIG. 9 is a schematic diagram of the exploded structure of FIG. 7.

The rotating and fixing rings of Embodiment 1 are respectively provided with toothed rings on the outer diameter to facilitate holding and rotation. As shown in FIGS. 7-9, in Embodiment 2, the above toothed rings are omitted, and the height of the bottle in Embodiment 2 is lower than that of Embodiment 1.

Before use, according to the rotating large circle and the fixed large circle of the logo prompts, rotate the large circle, open the head cap assembly, the fixed large circle to add the packaging of lyophilized powder products, the head cap assembly of the rotating large circle and the fixed large circle to re-fix the fastening; and then, open the bottle body, the bottle body of the inner bottle to add the liquid, the vacuum bottle is ready for use. When in use, turn the rotating circle, the powder product in the rotating ring falls into the liquid stored in the inner bottle, shake the vacuum bottle, and the vacuum bottle is ready for use.

In summary, the vacuum bottle is a form of packaging for cosmetic products, which is mainly used to hold the ingredients of cosmetic products unaffected by the external environment, in order to prolong their freshness and maintain the quality and effectiveness of the products, so as to maintain the stability of the ingredients, provide better sealing performance, and enhance the user experience. The vacuum bottle comprises of two parts: an inner bottle, which is a small airtight container that holds the cosmetic ingredients, and an outer bottle, which is an outer container that protects the inner flask and provides additional sealing and stability. During the manufacturing process, the inner bottle is placed inside the outer bottle and the air between the two is extracted through a special process and sealing technology, creating a vacuum environment; this vacuum prevents air, moisture and other harmful substances, thereby minimizing oxidation, bacterial growth, and other factors that could compromise the cosmetic ingredients.

The invention claimed is:

1. A fresh-keeping vacuum bottle with two compartments, comprising:
 - a first bottle;
 - a piston inside the first bottle, a vent hole being provided in a bottom of the first bottle;
 - a fixed large circle, a mouth of the first bottle being connected to the fixed large circle through snap fitting, defining a lower liquid storage cavity in the first bottle between the piston and the fixed large circle;
 - a rotating large circle,
 - an inner sleeve large circle;
 - a pump core assembly;
 - a head cap connected to the lower liquid storage cavity through the pump core assembly;
 - a gasket provided between the fixed large circle and the mouth of the first bottle, the gasket providing a seal between the fixed large circle and the mouth of the first bottle; and
 - a sealing plug disposed between the rotating large circle and the fixed large circle, the sealing plug being affixed to a bottom of the rotating large circle, wherein:
 - the fixed large circle includes a lower through hole at a position above the lower liquid storage cavity,
 - the rotating large circle includes an upper through hole that is able to align with lower through hole when the rotating large circle is rotated relative to the fixed large circle;
 - the sealing plug includes a middle through hole that aligns with the upper through hole of the rotating large circle;
 - a ring mouth at a bottom of the inner sleeve large circle is fastened and attached to the rotating large circle;
 - the pump core assembly is fastened and attached to the inner sleeve large circle or the rotating large circle, with an outer circumference of the pump core assembly being hermetically fit to the fixed large circle, the rotating large circle, and the inner sleeve large circle;
 - an upper storage cavity is formed between an upward-facing surface of the rotating large circle and a downward-facing surface of the inner sleeve large circle;
 - the rotating large circle is configured to, upon being rotated, drive the sealing plug to rotate to a position at which the upper through hole of the rotating large circle, the middle through hole of the sealing plug, and the lower through hole of the fixed large circle are aligned sequentially, causing material stored in the upper storage cavity to fall into the first bottle and mix with a liquid stored in the first bottle.

2. The fresh-keeping vacuum bottle with two compartments as described in claim 1, wherein:
 - the pump core assembly is fastened and attached to an upper catch groove located in a middle of the inner sleeve large circle;
 - a lower catch ring of the inner sleeve large circle is spaced radially inward from the ring mouth at the bottom of the inner sleeve large circle and is fastened and attached to an inner catch ring of the rotating large circle; and
 - the pump core assembly is disposed within a pump core cavity hermetically formed by the inner sleeve large circle, the rotating large circle, and the fixed large circle.

3. The fresh-keeping vacuum bottle with two compartments as described in claim 2, wherein:
 - the rotating large circle includes a top ring mouth and an inner wall circle disposed radially inward of the top ring mouth;
 - the ring mouth at the bottom of the inner sleeve large circle is hermetically fastened and attached between the top ring mouth of the rotating large circle and the inner wall circle; and
 - an upper edge of the inner wall circle is positioned lower than an upper edge of the inner catch ring of the rotating large circle, the inner catch ring being spaced radially inward from the inner wall circle.

4. The fresh-keeping vacuum bottle with two compartments as described in claim 2, wherein:
 - a head cap sleeve mouth that is smaller than lower outer diameter of the inner sleeve large circle and protruded upward is disposed in the middle of the inner sleeve large circle;
 - the upper catch groove of the inner sleeve large circle is provided on a bottom of the head cap sleeve mouth;
 - a cover latch rib protrudes outward from the inner sleeve large circle;
 - an outermost circumferential surface of the head cap is inserted into the head cap sleeve mouth of the inner sleeve large circle, and
 - a nozzle is disposed at a liquid outlet of the head cap.

5. The fresh-keeping vacuum bottle with two compartments as described in claim 4, wherein an outer cover is attached to the cover latch rib of the inner sleeve large circle.

6. The fresh-keeping vacuum bottle with two compartments as described in claim 1, wherein a bottom of the upper storage cavity is a concave upward-facing face of the rotating large circle.

7. The fresh-keeping vacuum bottle with two compartments as described in claim 1, wherein:
 - the sealing plug has notches on an outer edge of the sealing plug and on an edge of a central hole of the sealing plus;
 - the rotating large circle has locating columns protruded on the bottom of the rotating large circle and into the notches;
 - the sealing plug is joined to the bottom of the rotating large circle; and
 - a protruded sealing rib is provided on the sealing plug, surrounding the central hole of the sealing plug.

8. The fresh-keeping vacuum bottle with two compartments as described in claim 1, wherein:
 - an upwardly protruded ring latch is disposed on a ring mouth of the fixed large circle where the fixed large circle is attached to the rotating large circle; and
 - a raised piece is provided in the rotating large circle at a point where the ring latch fits against the rotating large circle.

9. The fresh-keeping vacuum bottle with two compartments as described in claim 1, further comprising a second bottle that surrounds on outer circumferential surface of the first bottle and a bottom surface of the first bottle, wherein the first bottle, the fixed large circle, the rotating large circle, the inner sleeve large circle, the pump core assembly, and the head cap are connected sequentially to form a replacement bottle.

10. The fresh-keeping vacuum bottle with two compartments as described in claim 9, wherein;
 - fastening holes are symmetrically located on a mouth of the second bottle;
 - lead-in grooves are provided on an inner diameter side of the mouth of the second bottle corresponding to the fastening holes, respectively;

protruded fixing ribs are provided on the replacement bottle, each of the fixing ribs being configured to enter a respective one of the lead-in grooves of the second bottle and, upon rotation of the replacement bottle relative to the second bottle, enter a respective one of the fastening holes, thereby securing the second bottle to the replacement bottle.

11. The fresh-keeping vacuum bottle with two compartments as described in claim 9, wherein a vacuum environment is created between the first bottle and the second bottle.

12. The fresh-keeping vacuum bottle with two compartments as described in claim 1, wherein:

the fixed large circle has a first outer peripheral surface configured to be manually accessible by a user, and the rotating large circle has a second outer peripheral surface configured to be manually accessible by the user, the first outer peripheral surface being located above the second outer peripheral surface.

* * * * *